United States Patent [19]

Mathieu

[11] Patent Number: 4,550,484

[45] Date of Patent: * Nov. 5, 1985

[54] METHOD OF MAKING BRAKE SYSTEM ASSEMBLY FOR RAILWAY VEHICLE

[75] Inventor: Julien C. Mathieu, Waynesville, N.C.

[73] Assignee: Dayco Corporation, Dayton, Ohio

[*] Notice: The portion of the term of this patent subsequent to Jun. 5, 2001 has been disclaimed.

[21] Appl. No.: 617,045

[22] Filed: Jun. 4, 1984

Related U.S. Application Data

[62] Division of Ser. No. 286,139, Jul. 23, 1981, Pat. No. 4,452,345.

[51] Int. Cl.$^4$ ............................................. B23P 11/00
[52] U.S. Cl. ................................. 29/434; 29/453; 29/526 R; 403/252
[58] Field of Search ............ 29/453, 526 R, 434; 105/1 A, 225; 213/61; 188/33, 205 R, 207, 219.1, 233.3, 46, 49, 52, 56, 57; 403/353, 397, 252; 308/3 R, 3 C, DIG. 7, DIG. 8

[56] References Cited

U.S. PATENT DOCUMENTS

| | | | |
|---|---|---|---|
| 2,164,474 | 7/1939 | Schaefer | 188/207 |
| 2,803,050 | 8/1957 | Fernberg | 403/397 |
| 3,200,488 | 8/1965 | Johansson | 29/453 |
| 3,368,267 | 2/1968 | Hedberg | 29/453 X |
| 3,807,675 | 4/1974 | Seckerson | 29/453 X |
| 4,068,966 | 1/1978 | Johnson et al. | 403/397 |
| 4,079,818 | 3/1978 | Chierici | 188/207 |
| 4,120,404 | 10/1978 | Chierici et al. | 213/61 |
| 4,238,039 | 12/1980 | Cooper et al. | 213/61 |

FOREIGN PATENT DOCUMENTS 1148656 4/1969 United Kingdom ............... 403/379

Primary Examiner—Charlie T. Moon
Attorney, Agent, or Firm—Joseph V. Tassone

[57] ABSTRACT

A brake system for a railway vehicle and method of making same are provided and such brake system comprises a brake rod member, a horizontal supporting member which is adapted to support the rod member for sliding movements thereon, and an antifriction component carried by the supporting member with the component serving to minimize wear and enable antifriction movements during the sliding movements and wherein the component comprises a solid strip portion of substantially rectangular cross-sectional configuration with the system further comprising at least one self-contained clip device for locking the strip portion against the supporting member and the clip device comprises a pair of resilient parallel legs and locking projections extending from the outer end portions of the parallel legs toward each other, with the clip device being disposed with the parallel legs embracing opposed vertical surfaces of the supporting member and with the projections snap locked beneath a bottom surface thereof.

3 Claims, 12 Drawing Figures

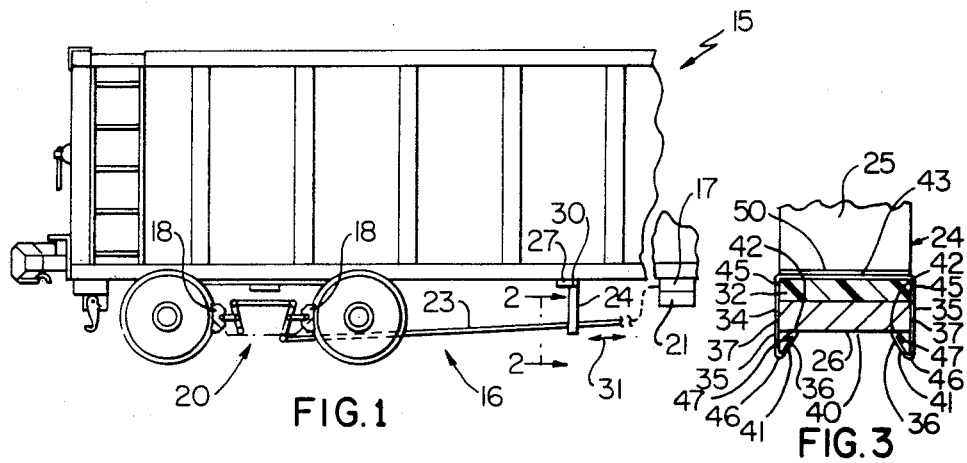
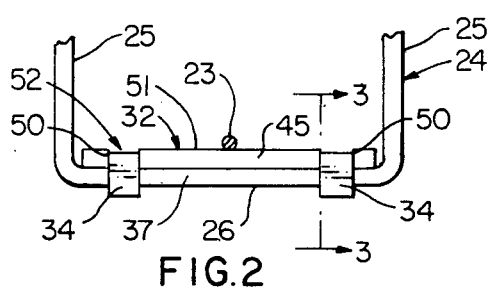
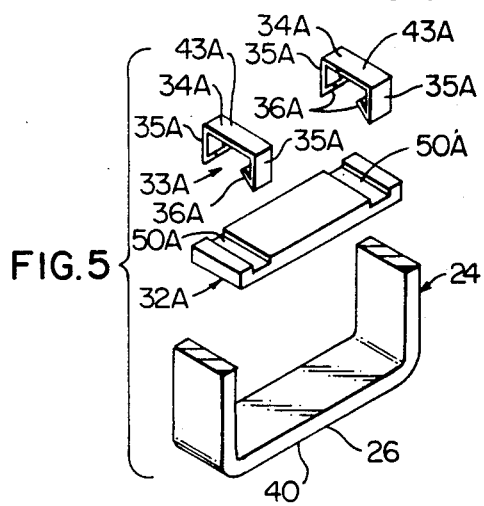
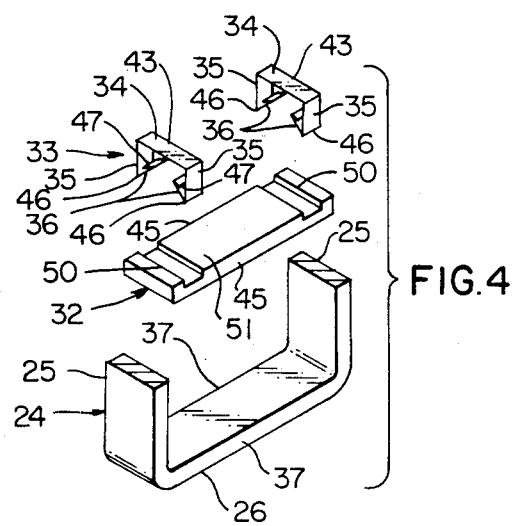
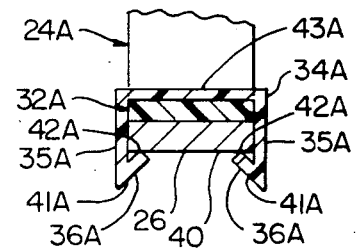

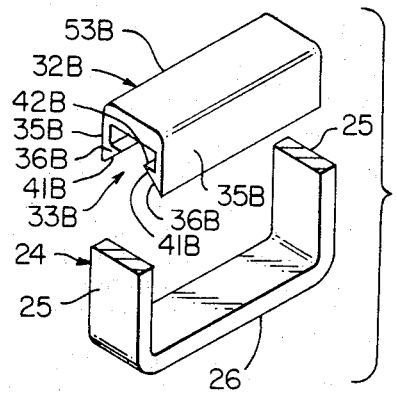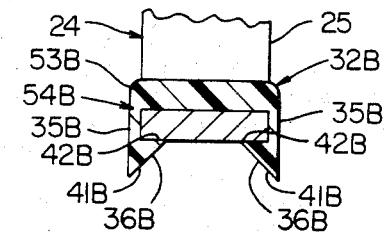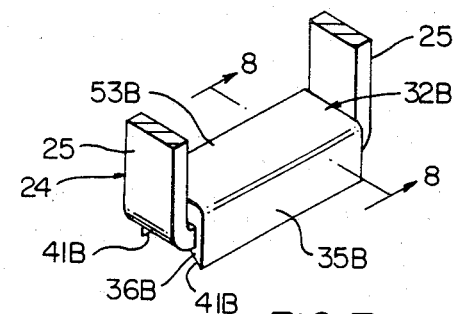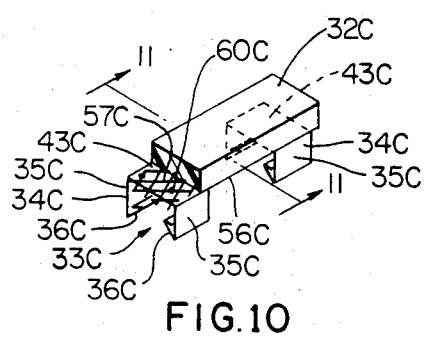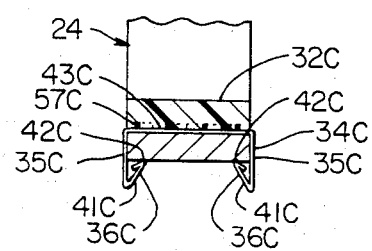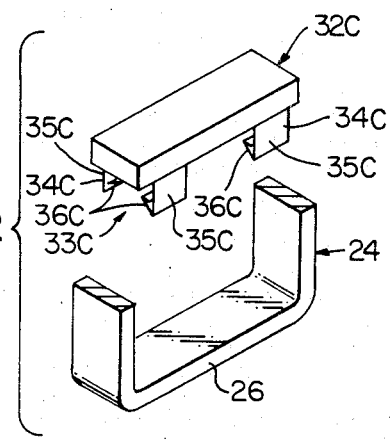

METHOD OF MAKING BRAKE SYSTEM ASSEMBLY FOR RAILWAY VEHICLE

This is a division of application Ser. No. 286,139, filed July 23, 1981, now U.S. Pat. No. 4,452,345.

BACKGROUND OF THE INVENTION

1. Field of the Invention

This invention relates to a brake system for a railway vehicle and method of making the same.

2. Prior Art Statement

The brake system of a railway vehicle conventionally includes an actuating cylinder, brake shoes for the vehicle, and suitable mechanical devices interconnected between the cylinder and shoes. The entire brake system is operated by a conventional control system.

Accordingly, in such a conventional brake system it is known to provide a brake rod member, a support structure for the brake rod member, with the support structure having a horizontally disposed supporting member which is adapted to support the rod member for sliding movements thereon, and an antifriction component made primarily of an ultra high molecular weight polymeric material and carried by one of the members with the component service to minimize wear and enable antifriction movements during the sliding movements and as disclosed in U.S. Pat. No. 4,079,818.

It is also known in the art to provide a wear member for use between a pair of relatively movable components of a railway vehicle with the wear member comprising a support having a continuous supporting surface, an ultra high molecular weight polymeric material having an antifriction wear surface, and a metal grid-like structure for attaching the polymeric material to the support and supporting same against the continuous supporting surface while providing integral reinforcement for the polymeric material and as disclosed in U.S. Pat. No. 4,238,039.

However, in the brake system disclosed in the above-mentioned patent, the antifriction component has the deficiency of comparatively high cost which is due to the large amount of polymeric material required and the complex configuration thereof.

It is an object of this invention to provide an improved brake system for a railway vehicle.

Another object of this invention is to provide an improved method of making a brake system of the character mentioned.

Other aspects, embodiments, objects, and advantages of this invention will become apparent from the following specification, claims and drawings.

SUMMARY

In accordance with the present invention there is provided an improved brake system for a railway vehicle which overcomes the above-mentioned deficiency. The improved brake system comprises a brake rod member, a support structure for the brake rod member, with the support structure having a horizontally disposed supporting member which is adapted to support the rod member for sliding movements thereon, and an antifriction component made primarily of an ultra high molecular weight polymeric material and carried by one of the members with the component serving to minimize wear and enable antifriction movements during the sliding movements.

In accordance with one embodiment of this invention the above-mentioned component comprises a solid strip portion of substantially rectangular cross-sectional configuration and the system further comprises self-contained clip means for locking the strip portion against the supporting member, with the clip means comprising a pair of resilient parallel legs and a locking projection extending from the outer end portion of each parallel leg toward the other parallel leg, and with the clip means being disposed with the parallel legs embracing opposed vertical surfaces of the supporting member and with the projections snap locked beneath a bottom surface thereof.

Also provided in accordance with this invention is an improved method of making a brake system for a railway vehicle.

BRIEF DESCRIPTION OF THE DRAWINGS

The accompanying drawings show present preferred embodiments of this invention, in which FIG. 1 is a fragmentary view illustrating an exemplary railway vehicle in the form of a railway car which utilizes one exemplary embodiment of the brake system of this invention;

FIG. 2 is a view, taken essentially on the line 2—2 of FIG. 1, illustrating an antifriction component supported on a horizontally disposed supporting member of a support structure and such component serves to minimize wear between a brake rod member slidably supported on the supporting member and such supporting member;

FIG. 3 is an enlarged cross-sectional view taken essentially on the line 3—3 of FIG. 2;

FIG. 4 is an exploded isometric view of the parts illustrated in FIG. 3 particularly showing the antifriction component and clip means consisting of a pair of clips for snap locking the component in position;

FIG. 5 is a view similar to FIG. 4, illustrating another exemplary embodiment of an antifriction component comprising the brake system of this invention and associated clip means defined by a pair of clips made of synthetic plastic material;

FIG. 6 is a enlarged cross-sectional view, which is similar to FIG. 3, of the assembled components illustrated in FIG. 5 and also taken through one of the clips;

FIG. 7 is a fragmentary isometric view illustrating another exemplary embodiment of an antifriction component of this invention which has integral clip means defined as an integral part thereof;

FIG. 8 is an enlarged cross-sectional view taken essentially on the line 8—8 of FIG. 7;

FIG. 9 is an exploded isometric view of the parts illustrated in FIG. 7;

FIG. 10 is an isometric view with parts in cross section and parts broken away illustrating another exemplary embodiment of an antifriction component and associated clip means;

FIG. 11 is an enlarged cross-sectional view taken essentially on the line 11—11 of FIG. 10 with the structure of FIG. 10 installed on its supporting member; and FIG. 12 is an isometric view of the antifriction component and its clips as shown in FIG. 10 exploded away from its supporting member.

DETAILED DESCRIPTION

Reference is now made to FIG. 1 of the drawings which illustrates a railway vehicle in the form of a railway car 15 and such car has a brake system which is designated generally by the reference numeral 16. The brake system 16 may be of any type known in the art and may comprise a suitably supported actuating cylinder 17 (indicated schematically), brake shoes 18 for the car, a mechanical linkage system 20 between the cylinder and shoes, and a conventional control system 21 which is also shown schematically. A more detailed presentation of all cooperating components of the brake system has not been presented in this disclosure to keep the presentation simple and easily understandable. Only those cooperating parts of the brake system 16 particularly applicable to this invention will now be described in detail.

The brake system 16 and in particular the mechanical linkage system 20 thereof comprises a plurality of brake rod members including a brake rod member which is designated by the reference numeral 23. The system 20 also comprises a support structure 24 for the brake rod member 23 and such support structure 24 is often referred to as a support hanger.

The support hanger or structure 24 of this example is a substantially U-shaped structure which has a pair of vertically disposed arms each designated by the same reference numeral 25, and a horizontally disposed supporting member 26. The support arms are suitably fixed to the railway car 15 at the top portions thereof and in this example of the invention such support arms 25 are welded to a member 27 by welds 30 and the member 27 is in turn detachably fixed to the underside of the body of the railway car 15. The horizontally disposed supporting member 26 of the support structure 24 is particularly adapted to support the rod member 23 for sliding reciprocating movements thereon and such movements are designated schematically by the double arrow 31 in FIG. 1.

The brake system 16 comprises an antifriction component 32 which is carried by the member 26 and is engaged by the rod member 23. The component 32 serves to minimize wear and enable antifriction movements during sliding movements of the rod 23 on the horizontally disposed supporting member 26. The antifriction component 32 is made of an ultra high molecular weight (UHMW) polymeric material and preferably the component 32 is made of UHMW polyethelyne having a molecular weight of at least two million. Preferably the molecular weight of the polymeric material defining the component 32 is in the range of four to six million; however, such molecular weight may be even greater. The preferred technique for determining this molecular weight is referred to as the intrinsic viscosity test and is widely used in the United States.

The component 32 comprises a solid strip portion of substantially rectangular cross-sectional configuration and the cross-sectional configuration being referred to is any cross section taken perpendicular to the elongate dimension or longitudinal axis of such component 32.

The brake system 16 also comprises self-contained clip means which is designated generally by the reference numeral 33 for locking the strip portion 32 against the support member 26. The clip means 33 comprises at least one clip and in this example of the invention comprises a set of two clips each designated by the same reference numeral 34. Each clip 34 of the clip means comprises a pair of parallel legs each designated by the same reference numeral 35 and a locking projection 36 extending from the outer end portion of each parallel leg 35 toward the other parallel leg 35. The clips 34 of the clip means 33 are disposed with their parallel legs 35 embracing opposed vertical surfaces, each designated by the same reference numeral 37 in FIG. 3, of the supporting member 26 and with the locking projections 36 snap locked beneath a bottom surface 40 of such supporting member 26.

Each locking projection 36 has a cam surface 41 and a locking part 42. Each cam surface 41 is adapted to urge its associated leg 35 outwardly from an associated vertical surface 37 during installation of the strip portion or component 32 against the supporting member 26; and, once the locking part 42 of a particular locking projection 36 clears the bottom surface 40 its associated leg 35 snaps inwardly toward the other leg 35 of the pair with the locking part 42 beneath the bottom surface 40.

As will be readily apparent from FIGS. 2, 3, and 4 of the drawings the strip portion or component 32 in this example is a separate elongate strip and the clip means comprises the previously mentioned pair of substantially U-shaped clips 34. Each U-shaped clip 34 has a bight 43 with the above-described pair of legs 35 extending outwardly from such bight 43. Each clip 34 is adapted to be disposed with its bight 43 against a top surface of the strip portion or component 32 and with the parallel legs 35 also embracing opposed vertical surfaces of such strip which are disposed in vertical alignment with the opposed surfaces 37 of supporting member and the vertical surfaces of the strip which are so disposed in vertical alignment are each designated by the same reference numeral 45 and illustrated in FIG. 3 of the drawings.

Each locking projection 36 is defined as an angled end portion which adjoins the terminal end 46 of its leg 35 as an integral part thereof. In addition, each angled end portion has an outside surface which defines the cam surface 41 and a reversely formed or bent terminal tip 47 which defines the locking part 42 at the base of such tip.

The elongate strip or component 32 has a pair of substantially identical elongate cutout slots therein, each of which is designated by the same reference numeral 50. Each cutout slot is of roughly rectangular cross-sectional configuration and extends inwardly from the top surface 51 of the component 32; and, each cutout slot is preferably disposed with its elongate dimension perpendicular to the longitudinal axis or the elongate dimension of the elongate strip or component 32.

Each U-shaped clip 34 of the clip means 33 has its bight 43 which is adapted to be disposed in nested relation within an associated cutout slot 50. In particular, the width of each slot 50 is slightly larger than the corresponding width of the bight 43. Also, the thickness of the bight 43 and the depth of its associated cutout slot 50 is such that the top surface of the bight 43, with the clip 34 snap locked in position, is such that the top surface of the bight 43 is beneath the top surface 51 of the component 32 and as illustrated typically at 52 in FIG. 2.

Each U-shaped clip 34 in the embodiment of FIGS. 2–4 is preferably made of a metallic material; and, any suitable metallic material known in the art may be used for this purpose. However, preferably such clip is made of ferrous metal which has a resilient character and is such that the locking projections thereof will readily snap lock in position once the clip is installed around an associated component 32 and its horizontally disposed supporting member 26.

The brake system 16 may utilize other embodiments of cooperating components of this invention and such other embodiments are illustrated in FIGS. 5-6, 7-9, and 10-12 and are comprised of modifications of the antifriction component 32 and clip means 33 which are designated by the same reference numerals 32 and 33 followed by the reference letters A, B, and C, in FIGS. 5-6, 7-9, and 10-12 respectively; and, this has been achieved for ease of description and understanding of the invention. The cooperating components of FIGS. 5-6, 7-9, and 10-12 are completely interchangeable with the previously described similar components of FIGS. 2-4.

The component 32A of FIGS. 5 and 6 is particularly adapted to be supported on the horizontally disposed supporting member 26 in a similar manner as the component 32 previously described and using similar clip means 33A. However, the clip means 33A is defined by a pair of clips 34A each of which is made of a synthetic plastic material. Each clip 34A has parallel legs 35A and locking projections 36A; and, each clip 34A has a bight 43A which is particularly adapted to be received within an associated cutout slot 50A. In addition, the locking projection 36A of each clip 34A also has a cam surface 41A and which terminates in a locking part 42A, as seen in FIG. 6.

The manner of installing the strip or component 32A in position is substantially the same as previously described in connection with the installation of the component 32, with the exception that the plastic clips 34A are used instead of metal clips. The plastic clips 34A may be made of any suitable synthetic plastic material known in the art which is resilient in character and capable of being used as described earlier for clips 34 with the locking projections 36A snap locked in position beneath the bottom surface 40 of the horizontally disposed supporting member 26.

In the embodiment of the invention illustrated in FIGS. 7-9 the strip portion 32B and the clip means 33B are defined as a single-piece structure which is designated by the reference numeral 53B. The structure 53B is made of a single polymeric material and has a homogeneous character throughout. In particular, the structure 53B has its portion 32B and its integral parallel legs 35B preferably made of an ultra high molecular weight (UHMW) polymeric material such as polyethylene which has a molecular weight as previously described.

The single-piece structure 53B may be made utilizing any technique known in the art; however, preferably such structure 53B is made by extruding an elongate workpiece which is then cut so that the length thereof enables the structure 53B to be received snugly between the supporting arms 25 of an associated support structure 24 while resting portion 32B against the top surface of the horizontally disposed supporting member 26 with parallel legs 35B thereof snap locked around member 26.

Each parallel leg 35B of structure 53B has a locking projection 36B and a cam surface 41B. In addition, it will be seen that a locking part is also provided on each locking projection 36B and defined as a planar shoulder 42B which is disposed substantially perpendicular to its leg 35B. Further, in the single-piece structure 53B the parallel legs 35B extend from opposite side portions 54B of the strip 32B as an integral part thereof and as illustrated in FIGS. 8-9.

The strip portion of FIGS. 10-12 is also a separate elongate strip and is designated by the reference numeral 32C; and, the clip means 33C in this example also consists of a pair of metal clips 34C. Further, each clip 34C is substantially identical to the previously described clip 34 and has a pair of resilient parallel legs 35C and locking projections 36C. Each locking projection 36C has a cam surface 41C and a locking part 42C.

However, in the embodiment of FIGS. 10-12 each clip 34C is disposed with its bight fixed against a bottom portion or surface 56C of the strip 32C. Further, the strip portion or strip 32C has a grid-like metal structure which is preferably in the form of an expanded metal structure 57C embedded therein.

The expanded metal structure 57C is fixed to the bight 43C of each clip 34C by suitable means suchs as a weld means or spot welds 60C and the polymeric portion of the component 32C is formed in position against the bights 43C of clips 34C while enveloping the grid-like structure 57C and serving as a matrix therefor. The weld means or spot welds 60C serve as means fixing the component 32C to the clip means 33C and in particular to the two clips 34C defining the clip means 33C. The technique for forming the component 32C in a fixed manner against the bights 43C of the clips 34C is similar to the technique described in the previously mentioned U.S. Pat. No. 4,238,039, and the disclosure of this patent is incorporated herein by reference thereto.

The procedure for installing the component 32C with its integral clip means 33C, defined by clips 34C, on an associated horizontally disposed supporting member 26 is basically the same as previously described and will not be repeated.

In this disclosure of the invention a plurality of two clips have been illustrated in connection with the fastening of the strip portion or components 32, 32A, and 32C in position. However, it will be appreciated that in each instance a single clip may be used to define the clip means or more than two clips may be used, as desired.

Further, in the presentation of FIGS. 7-9 a single-piece structure 53B made of an ultra high molecular weight polymeric material is defined having component strip portion 32B and integral legs 35B on opposite sides which extend along the full length of the strip portion 32B. However, each leg on each side of strip portion 32B need not necessarily extend along the full length thereof but may be provided essentially as a plurality of integral legs having the general overall appearance of the legs of the structure illustrated in FIG. 10, for example; and, this may be achieved by cutouts in the legs 35B.

In this disclosure of the invention the presentation for each embodiment has been of a single brake rod member 23 and support structure for such brake rod member together with as associated antifriction component. However, it is to be understood that a plurality of brake rod members similar to member 23 are provided in a brake system and each would be supported with support structure and an antifriction component as described herein.

While present exemplary embodiments of this invention, and methods of practicing the same, have been illustrated and described, it will be recognized that this invention may be otherwise variously embodied and practiced within the scope of the following claims.

What is claimed is:

1. In a method of making a brake system for a railway vehicle comprising the steps of, providing a brake rod member, fastening a support structure for said brake rod member on said vehicle, said support having a horizontally disposed supporting member which is adapted to support said rod member for sliding movements thereon, providing an antifriction component made primarily of an ultra high molecular weight polymeric material, and attaching said component on one of said members, said component serving to minimize wear and enable antifriction movements during said sliding movements, the improvement in which said step of providing said component comprises providing a solid elongated strip portion of substantially rectangular cross-sectional configuration, providing a cut-out slot extending inwardly from a top surface of said elongated strip, and said attaching step comprises providing self-contained U-shaped clip means and locking said strip portion against said supporting member with said self-contained U-shaped clip means and locking said strip portion against said supporting member with said self-contained U-shaped clip means, said clip means comprising a pair of resilient parallel legs and a locking projection extending from the outer end portion of each parallel leg toward the other parallel leg, said clip means being disposed during said locking step with said parallel legs embracing opposed vertical surfaces of said supporting member and with said projections snap locked beneath a bottom surface thereof, and said U-shaped clip has the bight thereof disposed in nested relation within said slot.

2. A method as set forth in claim 1 in which each locking projection has a cam surface and a locking part, and said locking step comprises engaging said cam surfaces of said legs against associated vertical surfaces causing said legs to be urged outwardly away from each other and once each locking projection clears said bottom surface said legs snap inwardly toward each other with said locking parts beneath said bottom surface.

3. A method as set forth in claim 2 in which said step of providing said strip portion comprises providing said strip portion as a separate elongate strip, said step of providing self-contained clip means comprises providing at least one substantially U-shaped clip having a bight with said pair of parallel legs extending outwardly from said bight, and said method comprising the further step of disposing during said locking step said bight of said one clip against a top surface of said strip and with said parallel legs also embracing opposed vertical surfaces of said strip which are disposed in vertical alignment with said opposed surfaces of said supporting member.

* * * * *